United States Patent Office 3,732,161
Patented May 8, 1973

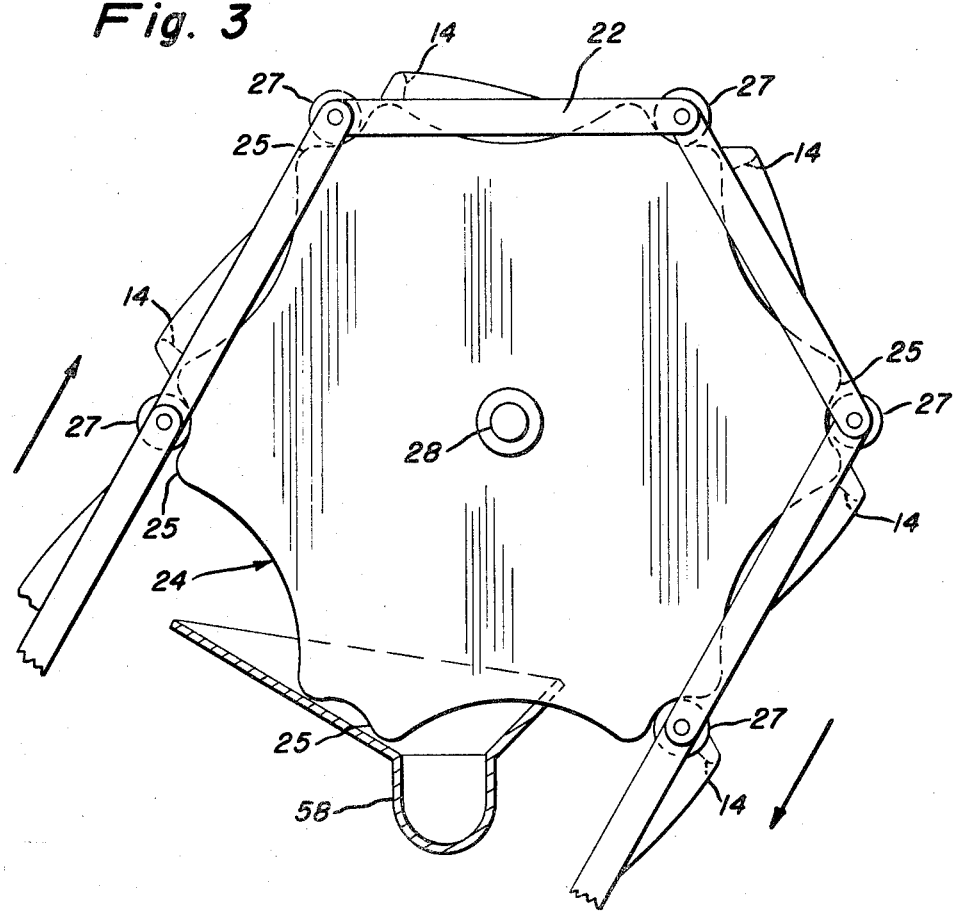
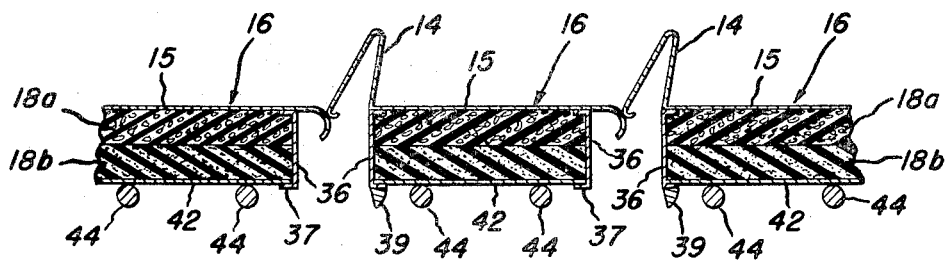

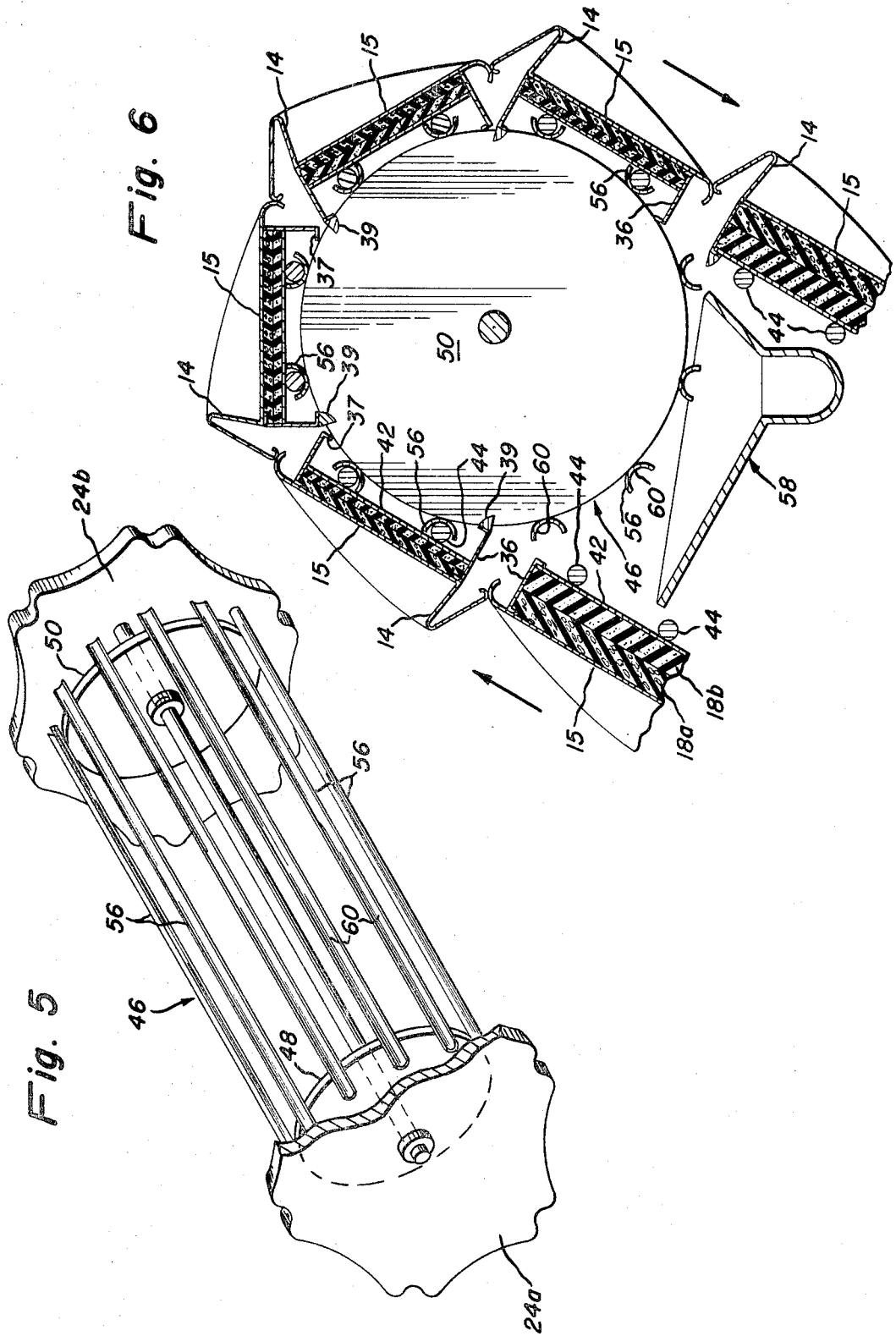

3,732,161
METHOD FOR REMOVING OIL AND DEBRIS FROM WATER
James F. Grutsch, Hammond, and Russell C. Mallatt, Crown Point, Ind., assignors to Standard Oil Company, Chicago, Ill.
Original application Mar. 18, 1970, Ser. No. 20,508. Divided and this application Jan. 22, 1971, Ser. No. 108,939
Int. Cl. E02b 15/04
U.S. Cl. 210—30          4 Claims

ABSTRACT OF THE DISCLOSURE

Oil, solid particles such as biological slime and floating debris, etc., are removed from water by an apparatus including endless chain means made up of a series of interconnected foraminous chambers holding a regenerable porous filter material such as polyurethane. Preferably, the filter material has an outer large pore section and an inner small pore section. A plurality of buckets are attached to the chain means and, as the chain means moves through a closed loop path, these buckets catch debris and dump it into a holding bin. Simultaneously, the filter material absorbs surface and subsurface oil and the like from water traveling through the filter material. The filter material is regenerated by squeezing the filter material to release the oil.

RELATED APPLICATIONS

This application is a divisional of U.S. S.N. 20,508, filed Mar. 18, 1970 and entitled Apparatus for Removing Oil and Debris From Water, now Pat. No. 3,608,727.

BACKGROUND

In U.S. Pat. No. 3,487,927, Robert L. Yahnke has disclosed oil and water separation equipment which relies on filtration principles. This unique piece of equipment uses, as the filtration medium, a foamed polyurethane belt trained about a perforated drum that is rotatably mounted in a water-holding tank into which oil-contaminated water is pumped. A differential in pressure is established across the belt and the contaminated water flows through the belt, with the oil being absorbed by the belt. Absorbed oil is subsequently removed from the belt and collected.

THE INVENTION

We have now invented a process for removing oil or the like from water and at the same time recover floating or submerged debris. Debris would normally rupture the delicate pore structure of the filter material used to absorb oil, but our improved process employs screening means external to the filter material which prevents any floating or submerged debris or the like from damaging the filter material. Further, the process solves the problem of skimming oil and debris is very rough water such as on the high seas.

DESCRIPTION OF DRAWINGS

FIG. 3 is an enlarged view showing the articulated movement of the buckets as they move over a drive sprocket.

FIG. 4 is a cross-sectional view of the foraminous chambers which hold the filter material.

FIG. 5 is an isometric view of the pressurizing means for squeezing oil from the filter material.

FIG. 6 is an enlarged cross-sectional view showing the filter material being squeezed to liberate absorbed oil.

DESCRIPTION OF PREFERRED EMBODIMENT

Figure 1:
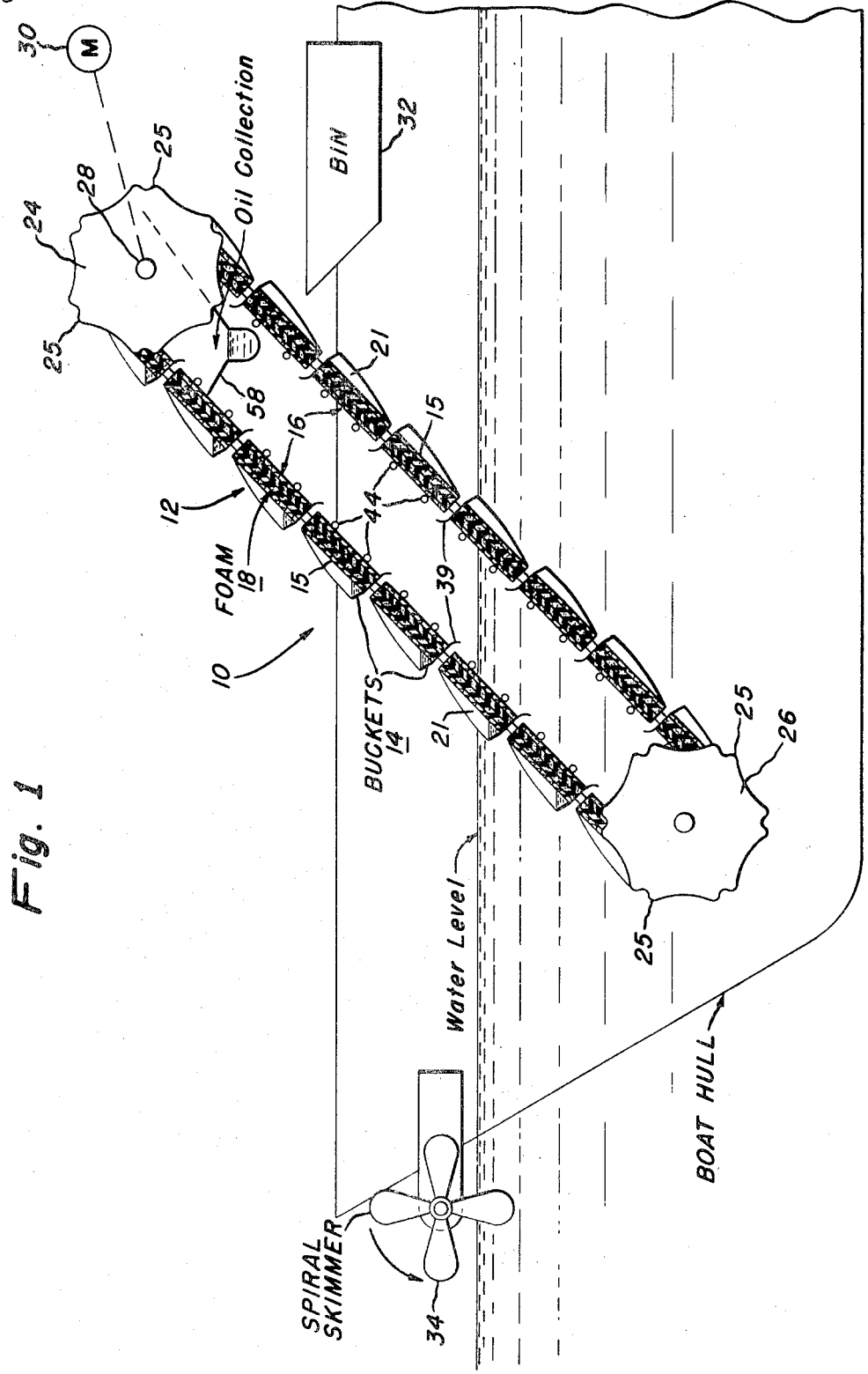
FIG. 1 is a schematic side view, partially in cross-section, of our apparatus mounted between the twin hulls of a catamaran.

As depicted in FIG. 1, our apparatus 10 is mounted between the dual hulls of a catamaran. The chief component of our apparatus 10 is endless carrier means 12 including a plurality of foraminous chambers 16 which hold regenerable porous filter material 18. Preferably, filter material 18 is reticulated hydrophobic foam such as polyurethane made up of an outer large pore section 18a and inner small port section 18b (FIG. 4). Outer section 18a, typically having 45 or less pores per linear inch, readily entraps viscous oils. Inner section 18b, typically having 60 or more pores per linear inch, readily entraps light fluid oil. The pores of section 18a are substantially larger than the pores of section 18b. Such a multi-porosity filter material is less likely to become clogged than a filter material having only a small pore structure. Alternately, the different chambers 16 may include foams having different size pore structures.

Figure 2:
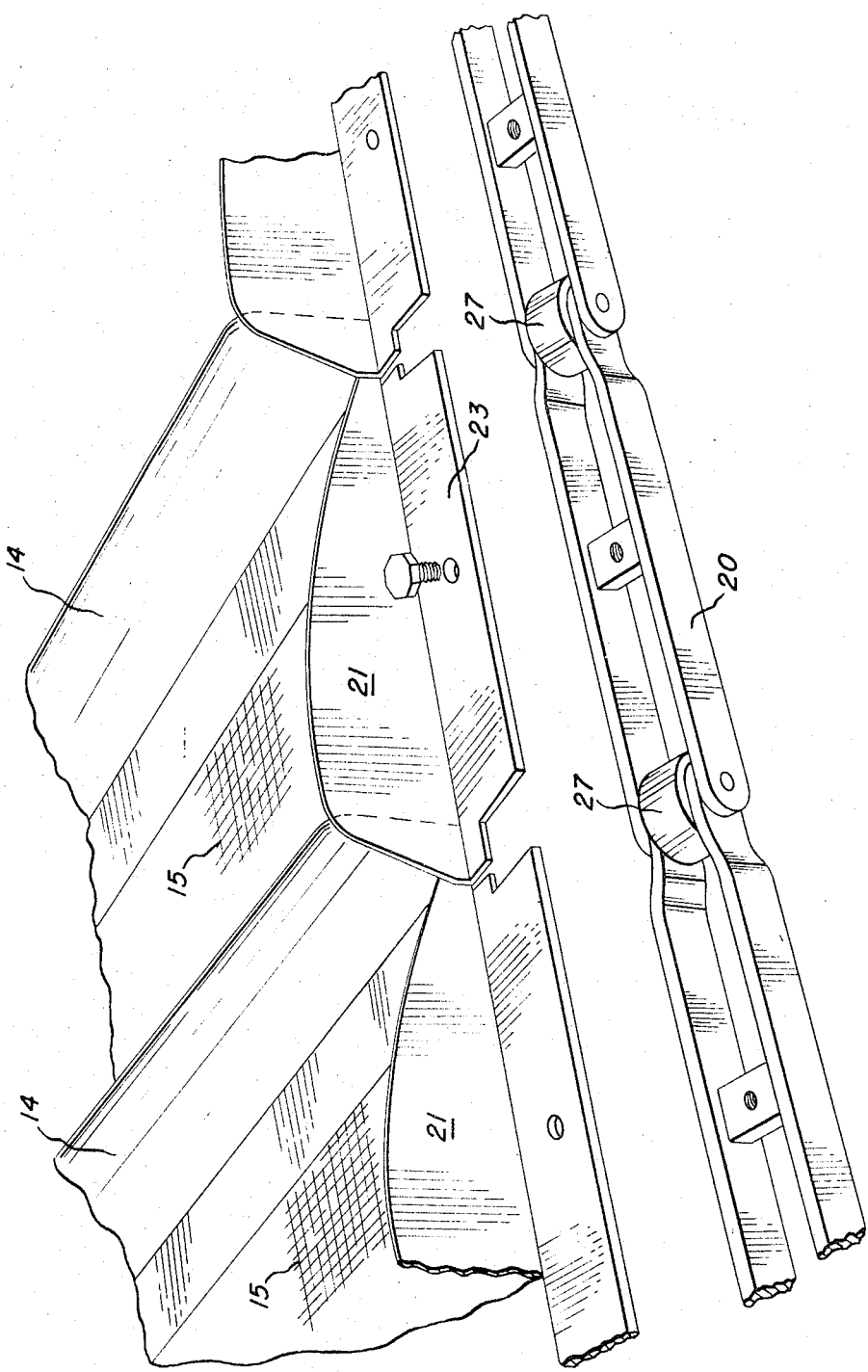
FIG. 2 is an exploded view showing the screened bottomed buckets which are used to protect the filter material and collect debris.

Each foraminous chamber 16 includes a bucket 14 which serves to collect debris, and each bucket 14 has screen bottom 15, and a pair of end plates 21 having associated therewith side flanges 23. These buckets 14 are connected between two series of endless chain links 20 (FIG. 2) and 22 (FIG. 3) which make up carrier means 12, and flanges 23 of buckets 14 are bolted to links 20 and 22, as depicted in FIG. 2. Chain links 20 and 22 are trained about sprockets 24 and 26 (FIG. 1) and, as illustrated in FIGS. 2 and 3, these links include rollers 27 which ride over tips 25 of the sprockets as these sprockets revolve. Sprocket 24, the drive sprocket, is above the water's surface and its drive shaft 28 is connected to drive motor 30. Sprocket 26, the idler sprocket, is below the water's surface and offset relative to drive sprocket 24. The offset arrangement of sprockets 24 and 26 inclines carrier means 12 relative to the horizontal, and the angle of inclination $\phi$ ranges between about 30° and about 90°, preferably about 60°.

The catamaran also includes debris storing bin 32 between the water's surface and sprocket 24. Screen bottomed buckets 14 catch debris and then dump it into this bin 32. Any liquid picked up by buckets 14 drains through screen bottoms 15 of the buckets and through filter material 18 and is thus purified. To further facilitate debris collection, the catamaran is also equipped with spiral or paddle wheel skimmer 34 in advance of chain means 12. Skimmer 34 directs in a positive manner surface debris and oil toward buckets 14.

FIG. 4 illustrates in detail the structure of foraminous chambers 16. Each of these chambers 16 includes rigid frame 36 secured to bottoms 15 of buckets 14. Frame 36 includes lip 37 for retaining filter material 18 and a movable inner pressure screen 42. Filter material 18 is disposed between screen bottom 15 and movable pressure screen 42, and it is regenerated by compressing it between bottom screen 15 and movable screen 42 to squeeze out absorbed oil. Edge 39 of frame 36 may be spoutlike to aid in directing liberated oil into oil collecting means 58 (FIG. 6) mounted inside the looped path of carrier means 12. Stiffeners 44 are attached to movable pressure screen 42 and, as shown in FIG. 6, these stiffeners act in conjunction with pressurizing means 46 to compress filter material 18 between the screens 15 and 42.

The pressurizing means 46, as shown in FIG. 5, includes mounting discs 48 and 50 disposed between the two hexagonal plates 24a and 24b of drive sprocket 24, and elongated members 56 having a C-cross section or grooves 60 mounted on the discs. As carrier means 12 moves through a closed looped path, members 56 come into registration with stiffeners 44 and the stiffeners then ride in C-grooves 60 of members 56. This forces pressure screen 42 toward screen bottom 15 and compresses filter material 18 between screens 15 and 42. Oil collecting means 58 then catches oil squeezed from filter material 18.

In operation, drive motor 30 turns drive shaft 28 of sprockets 24 causing carrier means 12 to move through a closed loop path dipping into the surface water and then being withdrawn. Floating debris is caught in buckets 14 and carried upwardly until it is above storing bin 32. Buckets 14 are then inverted as carrier means 12 moves over sprocket 24 and the debris falls into bin 32. At this point, water sprays may be used to clean debris from the screens. Oil and debris contaminated surface waters flow through filtering material 18 due to naturally occurring water currents, currents induced by movement of the catamaran and/or by the paddle wheel or spiral skimmer 34, and the pumping action induced by buckets 14 lifting water. Screen bottomed buckets 14 retain the debris, and oil is absorbed in the foam's pores. Absorbed oil is then squeezed out of filter material 18 by pressurizing means 46, with liberated oil falling into collecting means 58 and flowing or being pumped into a suitable container.

The advantages of our process are manifold. First, foraminous chambers 16 with screens 15 and 42 protect filter material 18 from debris. Oil on the surface of water acts as a collector for solid debris such as floating pieces of wood, leaves, rags, paper, branches, biological slime, etc. Sometimes this debris is so voluminous that it prevents the oil from flowing. At other times, debris is intentionally added, for example, dumping straw on the water to soak up oil. The filter material 18 must be protected from debris, otherwise the debris would make oil recovery difficult if not frequently impossible.

Second, the debris is automatically collected. Most harbors are laden with debris which is both ugly and a major water polluter. Cleanup of the debris is expensive because it is normally picked up by hand from small boats. Our multi-functional apparatus is a much more economical way of collecting debris and keeping it separate from any fluid oil. Moreover, the removal of debris makes it easier to collect oil.

Third, the particle-to-particle contact of the oil as it collects and accumulates in the foam causes the oil to coalesce and frequently de-emulsify to a significant degree.

Fourth, the lifting of oil high above the water establishes a hydraulic head which provides for transfer of the recovered, substantially de-emulsified oil to a receptacle vessel without using a pump which would re-emulsify the oil and water. Re-emulsification would require handling of a larger volume of oil-water emulsion and expensive de-emulsifying facilities to recover the oil.

Fifth, our apparatus may be extended far below the water's surface to pick up debris in depth, as would be required if a very heavy application of straw was used to soak up oil or if high waves and swells prevailed in the area to be skimmed. Our chain or carrier means 12 can dip into the water as far as necessary to assure continued contact with oil. Thus our apparatus can also be used for skimming in very rough water such as on the high seas.

Sixth, the use of a multi-porosity foam following a screen bottomed bucket permits handling, without a change-over in filter material or assembly, both heavy viscous and light fluid oils, as well as solid or semi-solid oils solidified by low prevailing temperatures or evaporation of the lighter components.

We claim:

1. A process for removing debris and oil from water, comprising the steps of:
    (a) passing the water through recovery means including a regenerable, porous filter material which traps the oil, and screening means external to and substantially coextensive with said filter material which collects debris and prevents said debris and the like from damaging the filter material, one of said screening means and said filter material being movable with respect to one another;
    (b) periodically removing the oil from the filter material to regenerate said material by affecting relative movement between the screening means and the filter material thereby squeezing the screening means against the filter material, said removed oil being collected; and
    (c) periodically removing the debris from the screening means, said debris being collected.

2. The process of claim 1 wherein said recovery means is movably mounted so that it may move through a closed loop path, with means along said path for removing and collecting the oil and debris.

3. The process of claim 1 wherein the filter material includes a large pore section and a small pore section.

4. The process of claim 1 wherein the filter material is polyurethane foam.

References Cited

UNITED STATES PATENTS

| | | | |
|---|---|---|---|
| 1,789,425 | 1/1931 | Cabrera | 210—400 X |
| 3,539,048 | 11/1970 | Pearson | 210—Dig. 21 |
| 3,142,281 | 7/1964 | Muller | 210—242 X |

OTHER REFERENCES

"Combatting Pollution Created by Oil Spills," Arthur D. Little Incorporated, AD 696,635, June 30, 1969, p. 34.

SAMIH N. ZAHARNA, Primary Examiner

U.S. Cl. X.R.

210—40, Dig. 21